United States Patent [19]

Griffiths et al.

[11] Patent Number: 4,892,236
[45] Date of Patent: Jan. 9, 1990

[54] DISPENSING MEASURES

[75] Inventors: Ronald S. Griffiths, Rochester; John E. Searles, Aylesford, both of England

[73] Assignee: R. and A. Bailey & Company Limited, United Kingdom

[21] Appl. No.: 298,305

[22] Filed: Jan. 18, 1990

Related U.S. Application Data

[63] Continuation of Ser. No. 60,001, Jun. 9, 1987, abandoned.

[30] Foreign Application Priority Data

Jun. 10, 1986 [GB] United Kingdom ................. 8614046
Jan. 28, 1987 [GB] United Kingdom ................. 8701912

[51] Int. Cl.$^4$ .................... G01C 1/12; G01F 11/28
[52] U.S. Cl. .................... 222/640; 222/442; 222/448; 222/477; 222/525; 251/55
[58] Field of Search ............ 222/425, 434, 442, 448, 222/449, 450, 451, 453, 640, 639, 477, 525, 559, 454, 501, 365; 251/55, 48

[56] References Cited

U.S. PATENT DOCUMENTS

| | | | |
|---|---|---|---|
| 1,857,363 | 5/1932 | Dencklau | 251/55 |
| 2,093,365 | 9/1937 | Ransom et al. | 222/442 X |
| 2,199,947 | 5/1940 | Benofsky et al. | 222/501 |
| 2,455,962 | 12/1948 | Wheeler | 222/453 X |
| 2,703,666 | 3/1955 | Iannelli | 222/449 X |
| 2,801,032 | 7/1957 | Hall | 222/449 |
| 3,591,059 | 7/1971 | Stearns | 222/453 X |
| 3,848,774 | 11/1974 | Schimke | 222/453 X |
| 3,865,277 | 2/1975 | Rimini | 222/453 X |
| 4,049,144 | 9/1977 | Schimke | 222/453 X |
| 4,288,009 | 9/1981 | Simmons | 222/449 X |
| 4,427,041 | 1/1984 | Coetzee | 222/442 X |

FOREIGN PATENT DOCUMENTS

| | | |
|---|---|---|
| 430680 | 8/1911 | France . |
| 11266 | of 1897 | United Kingdom . |
| 25405 | of 1898 | United Kingdom . |
| 594872 | 11/1947 | United Kingdom . |
| 755917 | 8/1956 | United Kingdom . |
| 2036695 | 7/1980 | United Kingdom . |

*Primary Examiner*—Joseph J. Rolla
*Assistant Examiner*—Gregory L. Huson
*Attorney, Agent, or Firm*—Arnold, White & Durkee

[57] ABSTRACT

A measure for use in dispensing drinks and other liquids which are of relatively high viscosity, such as cream based liqueurs, having a measuring chamber with an entry port and an exit port, an internal operating standard and an actuator to move the internal operating standard between a dispensing position in which it seals the entry port and a resting position in which it seals the exit port. The dispensing measure is also provided with a nose external to the measuring chamber, whereby having an external surface for guiding fluid flow which is fluid being dispensed from the measuring chamber flows through the exit port, on the external surface of the nose and into a receptacle held beneath. The internal operating standard has a portion which is cylindrical and fits slidably within a cylindrical internal wall of an outlet portion positioned at the exit port so that the internal wall is wiped clean as the internal operating standard returns to its resting position.

11 Claims, 15 Drawing Sheets

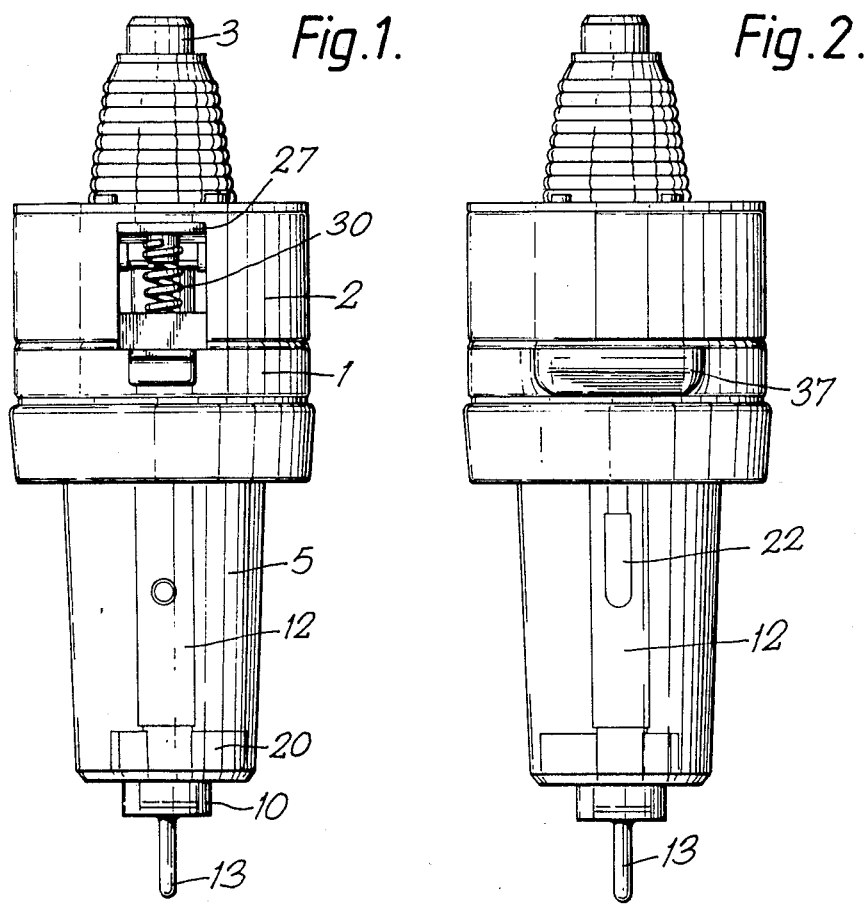

DISPENSING MEASURES

This is a Continuation of application Ser. No. 060,001 filed June 9, 1987 and now abandoned.

FIELD OF THE INVENTION

The present invention relates to dispensing measures and in particular to measures for use in dispensing drinks and other liquids which are of a relatively high viscosity, such as cream-based liqueurs.

BACKGROUND TO THE INVENTION

Conventional measures dispense liquids via a tubular outlet. When a high viscosity liquid is dispensed, a deposit of liquid is left on the inside of the tube and the tube eventually clogs with the residual materials if regular cleaning does not take place. In the case of cream-based liqueurs, the deposit loses its alcohol by evaporation, with the result that the remaining cream is no longer preserved against microbial spoilage. It is an object of the present invention to provide a dispensing measure which prevents any build up of materials being dispensed.

In addition, conventional measures are operated by an arm at the base of the measure which is actuated by a glass. It is, therefore, not very hygenic to refill an already used glass using this system. Accordingly, it is a further object of this invention to provide a measure which requires no contact with the glass whatsoever.

It is a still further object of the invention to provide a dispensing measure which is tamper-proof.

Conventional dispensing measures are fitted with a number of seals, for example, a bottom seal, a poppet valve seal, a head seal and a wiper seal. These seals become worn and can deteriorate fairly rapidly in spirits. It is another object of the present invention to provide a dispensing measure which has a reduced number of operating seals in contact with the spirit to be dispensed.

SUMMARY OF THE INVENTION

According to the present invention there is provided a dispensing measure having a head assembly with means for engagement with the neck of a bottle, a measuring chamber having an entry port and an exit port, an internal operating standard and a means to move the internal operating standard between a dispensing position in which it seals the entry port and a resting position in which it seals the exit port, wherein the dispensing measure is provided with a nose external to the measuring chamber, whereby the nose guides fluid into a receptacle, held beneath the dispensing measure, when fluid is being dispensed therefrom. Preferably the nose is an extension of the internal operating standard which extends through the exit port externally of the measuring chamber.

Preferably the exit port has a cylindrical wall and the internal operating standard has a portion which is cylindrical in shape, and which fits slidably within the said cylindrical wall of the exit port such that the wall of the exit port is wiped clean as the internal operating standard returns to its resting position after dispense.

The dispensing measure may be provided with an alignment means which ensures that the internal operating standard is aligned with the entry and exit ports as it travels between its resting position and its dispensing position. The alignment means may be a set of fins around both the entry port and the exit port, the said fins being within the measuring chamber and the internal operating standard travelling between the fins of each set.

Preferably, the means to move the internal operating standard between the dispensing position and the resting position is a lift rod attached to an operating lever. The internal operating standard may be fixed directly to one end of a lift rod, the lift rod passing through an aperture in the roof of the measuring chamber and the other end of the lift rod being connected to the operating lever, such that as the operating lever is depressed the lift rod is drawn into the head assembly thereby pulling the internal operating standard into the dispensing position.

According to a further preferred feature of the invention, the lift rod is L-shaped so that the foot of the L engages the internal operating standard, which is of cylindrical shape.

Advantageously, the dispensing measure is provided with an air valve which allows air to enter the measuring chamber as liquid is being dispensed therefrom. The aperture in the roof of the measuring chamber through which the lift rod passes may be adapted to form the air valve. In the preferred embodiment, one portion of the lift rod is of constant diameter over a portion of its length, this constant diameter portion sealing the said aperture when the dispensing measure is in the resting position, the lift rod is drawn into the head assembly when the operating lever is depressed, the said reduced diameter portion cannot seal the said hole and air is allowed to bleed into the measuring chamber. Preferably, the air valve is provided with an "0" seal to aid in sealing the valve.

The operating lever may be provided with a return mechanism which returns the lever to its resting position after it has been depressed. The return mechanism may comprise a return spring.

The dispensing measure may be provided with a timing device which ensures that a full measure is dispensed. The timing device may comprise a piston connected to the operating lever and movable within a piston chamber which is open to the atmosphere at its base, the top of the piston chamber being sealed to atmosphere except for a small air vent. When the operating lever is depressed the piston is pushed inot the piston chamber and when the lever is released the return spring acts to return the lever and the piston to the resting position. Movement of the piston up the piston chamber is delayed because air in the chamber can only escape slowly through the air vent and the air pressure in the piston chamber must be overcome before the piston returns to rest. Preferably the timing device is provided with a regulating means which can alter the size of the said air vent thereby allowing the dispense time to be adjusted. The regulating means may take the form of a regulating screw.

The head assembly may be formed with a solid internal portion which serves to separate the head assembly from the liquid in the measuring chamber.

The dispensing measure may be provided with a counter which counts the number of liquid measures dispensed by the measure. The dispensing measure may also be provided with a signalling device which can signal the number of liquid measures dispensed to a cash register or computer.

BRIEF DESCRIPTION OF THE DRAWINGS

Embodiments of the present invention will now be described with reference to the accompanying drawings, in which:

FIG. 1 is a front elevation of one embodiment of a dispensing measure according to the invention, FIG. 2 is a rear elevation of the measure.

DESCRIPTION OF THE INVENTION

Figure 3:
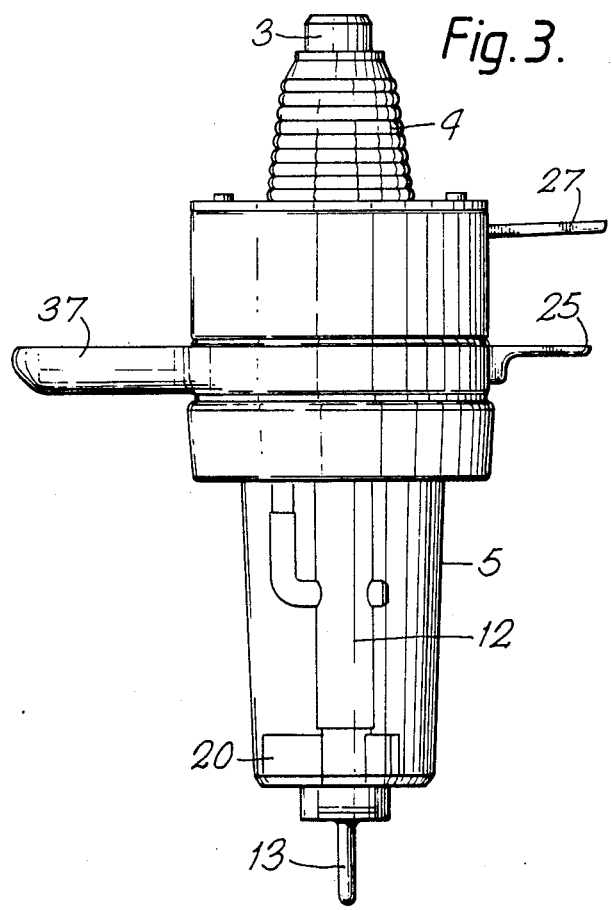
FIG. 3 is a left side elevation of the measure.
Figure 6:
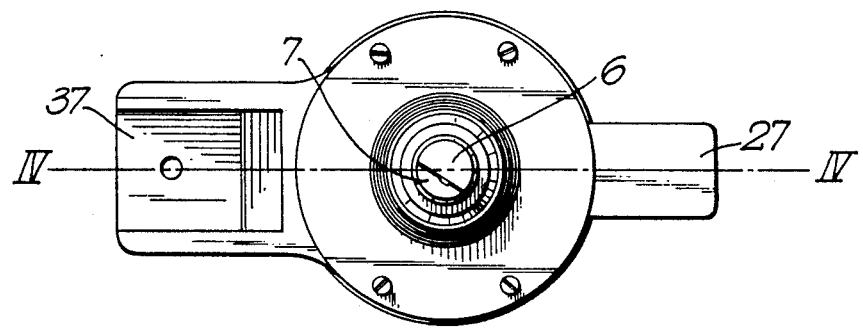
FIG. 6 is a top plan view of the measure.

As shown in the drawings, the dispensing measure comprises a head assembly 1 closed by a cap 2, from which projects a portion of a spigot tube 3 with a resilient bung 4 for engagement in the neck of a bottle. Below the head assembly 1 there is a measuring chamber 5. The spigot 3 has a hollow central channel 6 which extends through the head assembly and which is divided in two by a central plate 7 (not shown because it is parallel to plane of FIG. 4). This arrangement allows liquid to flow into the measuring chamber 5, from the bottle, via an entry port 8 in the roof of the chamber 5 and at the same time allows air to flow out of the chamber 5 as in conventional dispensing measures. The measuring chamber 5 is defined by a transparent plastics wall 9 of frusto conical shape with a flat base portion and an annular outlet portion 10 at the centre of the base, defining an exit port 11 which allows liquid to flow out of the measuring chamber.

Within the measuring chamber 5 there is an internal operating standard 12 which seals the exit port 11 in the base of the measuring chamber 5, when the measure is not dispensing liquid. The internal operating standard 12 is provided at its lower end with a nose 13 which extends beyond the exit port 11 externally of the measuring chamber 5. The nose is generally cylindrical with a radiused tip 14, and has an external surface for guiding the flow of fluid being dispensed from the measuring chamber 5.

Figure 8:
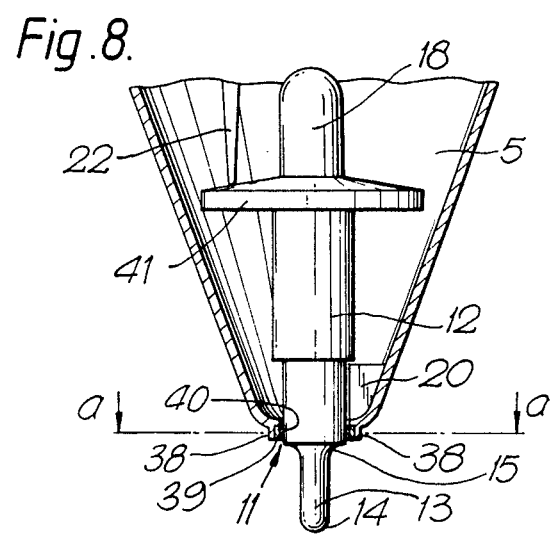
FIG. 8 is a cross-section through a portion of a second embodiment of a dispensing measure according to the invention showing the measuring chamber and internal operating standard in greater detail.
Figure 11:
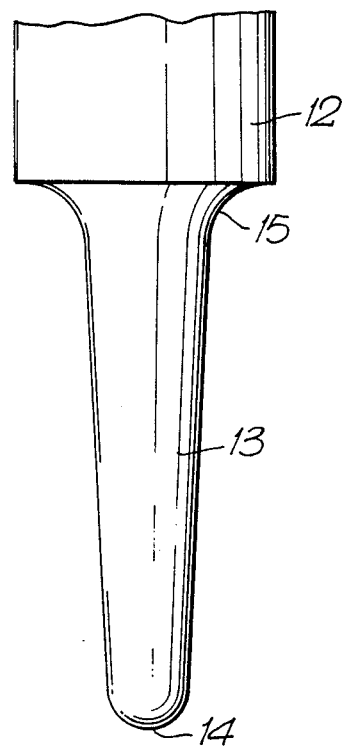
FIG. 11 is a detailed view of the nose of the internal operating standard in accordance with the second embodiment of the invention.

Alternatively, as shown in FIGS. 8 and 11, the nose 13 extends downwardly from a radiused step 15, which in rest position is level with the bottom of the exit port. The nose 13 then tapers slightly to a radiused tip 14.

The tip 14 should not have any nobble or bulbous shape, which might cause the liquid to form a tear drop. The nose 13 should be long enough for a smooth even flow to be established, guided by the nose 13, out of the exit port 11 when the internal operating standard 12 is in the dispensing position. The internal operating standard 12 is generally cylindrical. Its lower body portion 16 is a sliding fit inside the cylindrical internal wall of the outlet portion 10, and it carries an O-ring 17 which ensures sealing of the exit port 11. The base of the lower body portion is level with the bottom of the outlet portion 10 when the internal operating standard is in the rest position.

The upper end portion 18 of the internal operating standard 12 likewise is a sliding fit in the lower end region of the spigot 3 which defines the entry port 8. The upper end portion 18 carries an O-ring 19 which seals the entry port 8 when the internal operating standard is in the dispensing position.

Alternatively each end portion of the internal operating standard may be machined to be a close sliding fit within its respective port, so that the O-rings may be dispensed with.

The internal operating standard 12 is positioned vertically within the measuring chamber 5 by means of two sets, each of three fins, between which the internal operating standard 12 travels. The radially inward face of each fin is generally vertical. One set of fins 20 is positioned symmetrically around the exit port 11, while the other set of fins 21 is positioned symmetrically around the entry port 8, the fins in each case lying within the measuring chamber 5.

Figure 4:
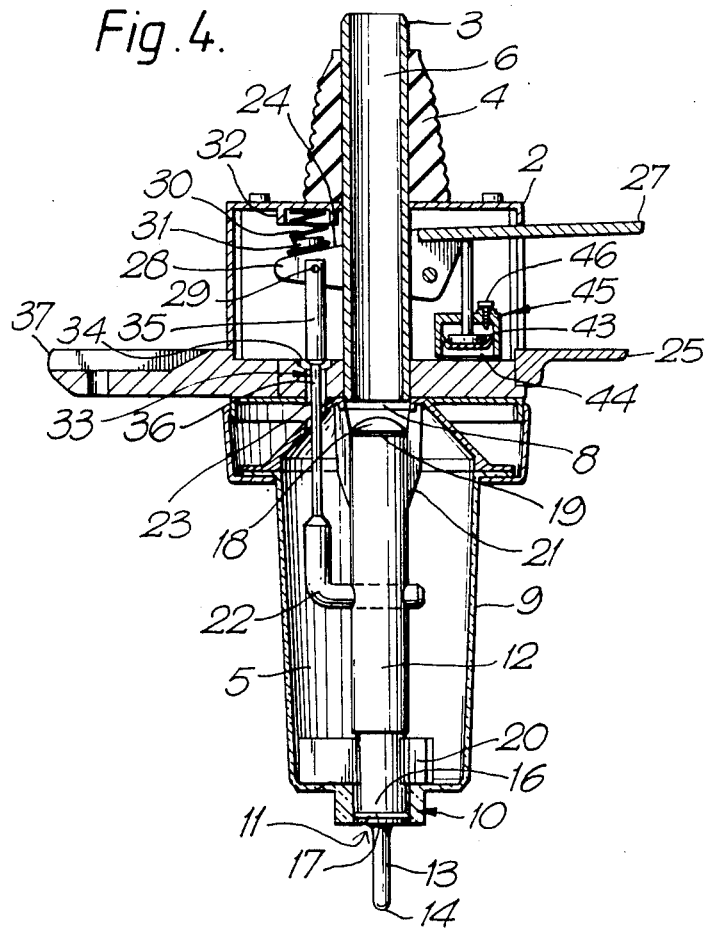
FIG. 4 is a vertical cross section of the measure as seen from the left side on the line IV—IV in FIG. 6.
Figure 7:
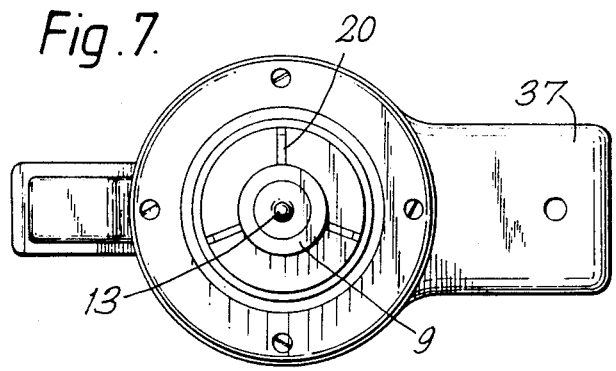
FIG. 7 is a underneath plan view of the measure.
Figure 5:
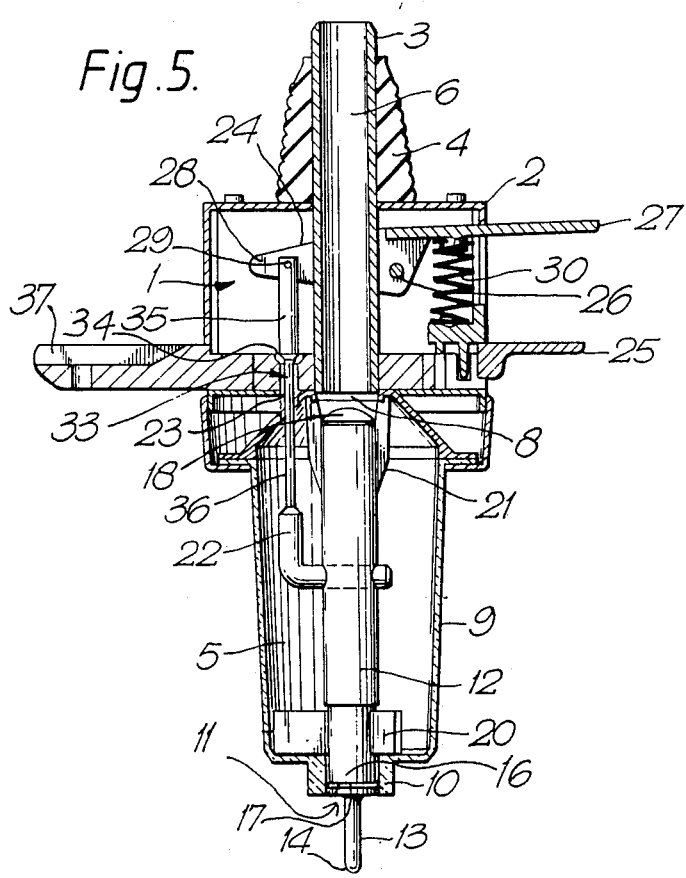
FIG. 5 is a vertical cross section of the measure on line IV-IV in FIG. 6, showing an alternative embodiment of the return spring.

The internal operating standard 12 is moved by a direct lift rod 22 which is generally L-shaped. The foot of the L-shape passes through a hole in the internal operating standard and thus engages it. The leg of the L-shape passes through an aperture 23 in the roof of the measuring chamber 5 and its top end is fixed to a lever 24 within the head assembly 1. The measure is operated by means of the lever 24, which can be pressed by the operator's finger while the thumb engages fixed handle 25. When the lever 24 is depressed the lever 24 pivots about a horizontal pin 26, thus raising the end of the direct lift rod 22. The lever 24 comprises a horizontal finger plate 27 and two vertical wall portions 28 bridged by the pin 26 and by a further pin 29 attached to the head of the direct lift rod 22. The space between the two wall portions 28 accommodates the spigot tube 3. The top edges of the wall portions 28 are inclined downwardly from the finger plate 27, so that the wall portions can be accommodated within the head assembly 1 when the finger plate 27 is depressed. The direct lift rod 22 is pulled into the head assembly 1 by the operation of the lever 23 and it in turn raises the internal operating standard 12. As shown in FIG. 4 the lever 24 acts against a return spring 30 located above the direct lift rod 22. The spring 30 acts between a boss 31 moulded on the upper surface of the internal end of the lever 24, and a cup 32 moulded onto the inner surface of the cap 2. As shown in Figure 5 the return spring 30 may alternatively be located within the cap 2, between the handle 27 and the base of the head assembly 1.

As the internal operating standard 12 is raised, the entry port 8 is sealed by upper end portion 18 of the internal operating standard and the exit port 11 is opened, thus allowing the liquid in the measuring chamber 5 to flow out. As the liquid flows out, the nose 13 guides the flow of liquid without splashing into a glass held beneath. The nose 13 ensures a clean laminar flow. The length of the internal operating standard 12 is designed such that the portion 18 seals entry port 8 and prevents further liquid flowing into the measuring chamber 5, before the exit port 11 is opened.

The direct lift rod 22 also operates an air valve 33 which serves to allow air to enter the measuring chamber 5 as liquid is being dispensed, in order to fully dispense the contents of the chamber 5 and to avoid any retention of liquid due to the creation of a vacuum in the measuring chamber 5. The aperture 23 in the roof of the measuring chamber 5 through which the direct lift rod 22 passes, is sealed with an "0" seal 34 which is fixed into position. The direct lift rod 22 is of constant diameter over a portion 35 of its length and then it tapers down to a reduced diameter portion 36. The length of the constant diameter portion 35 is determined such that when the direct lift rod 22 travels upwards in response to depression of the lever 24, the reduced diameter portion 36 does not reach the "0" seal 34 in aperture 23, to permit ingress of air into the chamber 5, until the internal operating standard 12 has been raised sufficiently to open the exit port 11.The "0" seal 34 is therefore sealed to atmosphere until the exit port 11 is opened. Since the "0" seal 34 is fixed in position and it is only the direct lift rod 22 which moves, no springs are required to maintain the seal, as in conventional dispensing measures. A pneumatic timing device (shown in FIG. 4) may also be incorporated into the head assembly 1 to ensure that a full measure is dispensed even if lever 24 is not kept in the depressed position until the measuring chamber 5 is completely emptied. The timing device comprises a piston 43 which is connected to lever 24 and which is pushed into a piston chamber 44 when the lever 24 is depressed. The piston chamber 44 is open to the atmosphere at its base. When the lever 24 is released, the return spring 30 tries to return the lever 24 to its resting position and the piston 43 tries to travel up the piston chamber 44. However, the top of the piston chamber is sealed to the atmosphere with the exception of a small air vent 45. Air pressure, therefore, delays travel of the piston 43 up the piston chamber 44 and in turn delays the return of the lever 24 to its resting position, until the air pressure is overcome. The incorporation of the pneumatic timing system therefore, ensures, if necessary, that a full measure is dispensed. The timing device also incorporates a regulating screw 46 which can be used to adjust the size of the air vent 45, thereby allowing for different times of dispense.

The dispensing measure is designed such that as the internal operating standard 12 returns to its resting position after liquid has been dispensed, it wipes clean the exit port 11, thus preventing any build up of liquid around the exit port 11. The dispensing measure of the present invention is also designed so that the only part of the measure which is both in contact with the liquid to be dispensed and open to the atmosphere is the nose 13 and it is simple to wipe clean after use.

In this dispensing measure, the measuring chamber wall 9 may be ultrasonically welded to the head assembly 1 which ensures that the measuring chamber 5 is sealed for the life of the measure and this renders it tamper-proof. The dispenser can be mounted on a bar or similar support by means of a mounting plate 37.

The seals 34, 17 and 19 are preferably made of silicone rubber. Although they are in contact with the liquid, they are not immersed in it.

Figure 9:
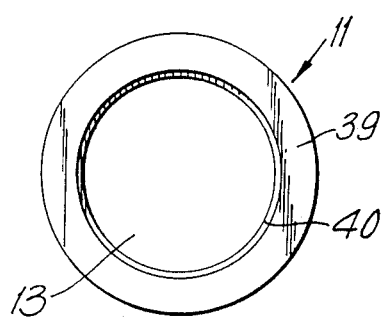
FIG. 9 is an underneath plan view of the exit port of the second embodiment of the dispensing measure.
Figure 10:
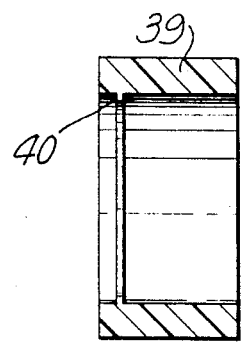
FIG. 10 is a cross-section through the dispensing measure along the line a—a in FIG. 8.

In an alternative embodiment of the measure shown in FIG. 8, the annular outlet 10 may be cylindrical and formed in two parts: a body portion 38 integral with the bowl of the measuring chamber and having a rebate opening downwardly; and a sleeve portion 39 which fits into the rebate in such a manner that the body portion 38 and sleeve portion 39 together form a cylindrical wall for the outlet. As shown in FIGS. 8 and 9, the internal surface of the sleeve portion 39 is provided with a flexible annular web 40 which replaces the O-ring 17 of the first embodiment. With time, the end of the internal operating standard which seals the exit port 11 may wear but this effect is compensated by the provision of the flexible annular web 40 about the exit port 11. In this embodiment the internal operating standard 12 bears a flange 41 to which one end of the direct lift rod 22 is fixed.

The dispensing measure of the present invention may optionally have a sealed counter to count the number of liquid measures which have been dispensed. The counter may be either a mechanical counter of the type desribed in British Patent No. 2 036 695 B or it may be an electrical counter. It may also include a signalling device which passes a signal to a cash register or computer each time a measure is dispensed.

The internal operating standard 12 can be manufactured from a food quality polytetrafluoroethylene such as that sold under the Trade Mark "Teflon" or a similar material having a very low coefficient of adhesion, while the web 40 may be made of an ultrahygenic plastic such as "Chemital" (Trade Mark).

Although designed particularly for use with cream-based liqueurs, the dispensing measure has general application in dispensing liquid measures. These need not, however, necessarily be drinks; instead they could be pharmaceuticals, foodstuffs such as ketchup, mayonnaise or cream, or acid cleaners for coffee machines.

We claim:

1. A dispensing measure for dispensing fluids having a head assembly with means for engagement with the neck of a bottle, a measuring chamber having an entry port and an exit port, an internal operating standard, an outlet portion at the exit port having a cylindrical internal wall, the internal operating standard having a bottom portion consisting essentially of a cylindrical portion and a nose portion smaller in diameter than said cylindrical portion, and additionally a means to move the internal operating standard alternately between a dispensing position in which it seals the entry port and a resting position in which it seals the exit port, the cylindrical portion having a cylindrical external surface which fits slidably and sealingly within the cylindrical internal wall of the outlet portion for wiping clean the entire internal wall of the outlet portion as the internal operating standard returns to its resting position after dispensing, the nose portion having an external surface for guiding fluid flow, only the nose portion extending beyond the outlet portion externally of the measuring chamber, and the external surface of the nose portion being entirely external to the measuring chamber when in said rest position, whereby fluid being dispensed from the measuring chamber flows through the exit port, and on the external surface of the nose portion and then directly into a receptacle held beneath the dispensing measure.

2. A measure according to claim 1 wherein the nose is an extension of the internal operating standard and when the internal operating standard is in the dispensing position, the nose extends through the exit port externally of the measuring chamber.

3. A measure according to claim 1 wherein the dispensing measure is provided with an air valve which allows air to enter the measuring chamber as liquid is being dispensed therefrom.

4. A measure according to claim 1, further comprising an alignment means within the measuring chamber which ensures that the internal operating standard is aligned with the entry and exit ports as it travels between its resting position and its dispensing position.

5. A measure according to claim 4 wherein the alignment means comprises a set of fins around both the entry port and the exit port, the internal operating standard travelling between the fins of each set.

6. A measure according to claim 1 wherein the means to move the internal operating standard between the dispensing position and the resting position comprises an operating lever actuatable by a manual action.

7. A measure according to claim 6 wherein the operating lever is provided with a return mechanism which returns the lever to its resting position after it has been actuated.

8. A measure according to claim 6 wherein the internal operating standard is fixed to one end of a lift rod, the lift rod passing through an aperture in the measuring chamber and the other end of the lift rod being connected to the operating lever, such that as the operating lever is actuated, the lift rod is drawn into the head assembly thereby pulling the internal operating standard into the dispensing position.

9. A measure according to claim 8, wherein the lift rod is of a constant diameter over a portion of its length and tapers down to a reduced diameter portion, the constant diameter portion sealing said aperture when the dispensing measure is in the resting position, such that as the lift rod is drawn into the head assembly, the said reduced diameter portion ceases to seal said aperture and air is allowed to bleed into the measuring chamber as liquid is dispensed therefrom.

10. A measure according to claim 6 which is provided with a timing device comprising a piston connected to the operating lever and movable within a piston chamber which is open to the atmosphere at its base, the top of the piston chamber being sealed to the atmosphere except for a small air vent such that after manual actuation of said lever, said piston controls the rate at which said internal operating standard returns to said resting position, thereby ensuring that said exit port is open for a predetermined period of time.

11. A measure according to claim 10 wherein said small air vent is provided with a regulating means which can alter the size of the small air vent, thereby allowing said predeterimed period of time to be adjusted.

* * * * *

UNITED STATES PATENT AND TRADEMARK OFFICE
CERTIFICATE OF CORRECTION

PATENT NO. : 4,892,236

DATED : January 9, 1990

INVENTOR(S) : Griffiths et al.

It is certified that error appears in the above-identified patent and that said Letters Patent is hereby corrected as shown below:

Title page:

[22], change "Filed: Jan. 18, 1990" to --Filed: Jan. 18, 1989--.

Signed and Sealed this

Twenty-fifth Day of June, 1991

Attest:

Attesting Officer

HARRY F. MANBECK, JR.

Commissioner of Patents and Trademarks